No. 837,547. PATENTED DEC. 4, 1906.
G. CURLEY.
COMBINED CONTINUOUS KILN AND DRIER.
APPLICATION FILED JUNE 22, 1906.
5 SHEETS—SHEET 1.
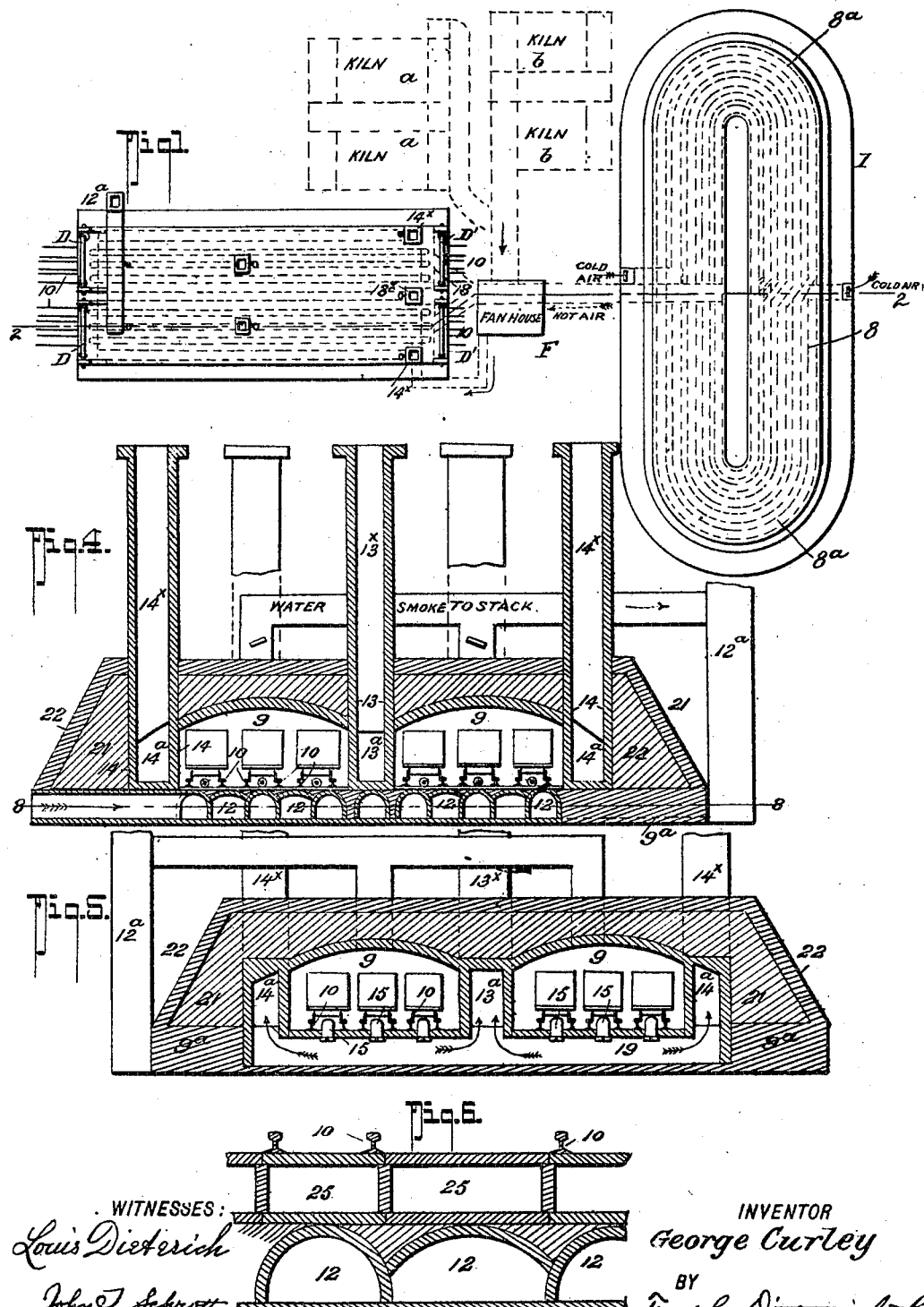
WITNESSES:
Louis Dieterich
John T. Schrott
INVENTOR
George Curley
BY
Fred G. Dieterich & Co.
ATTORNEYS

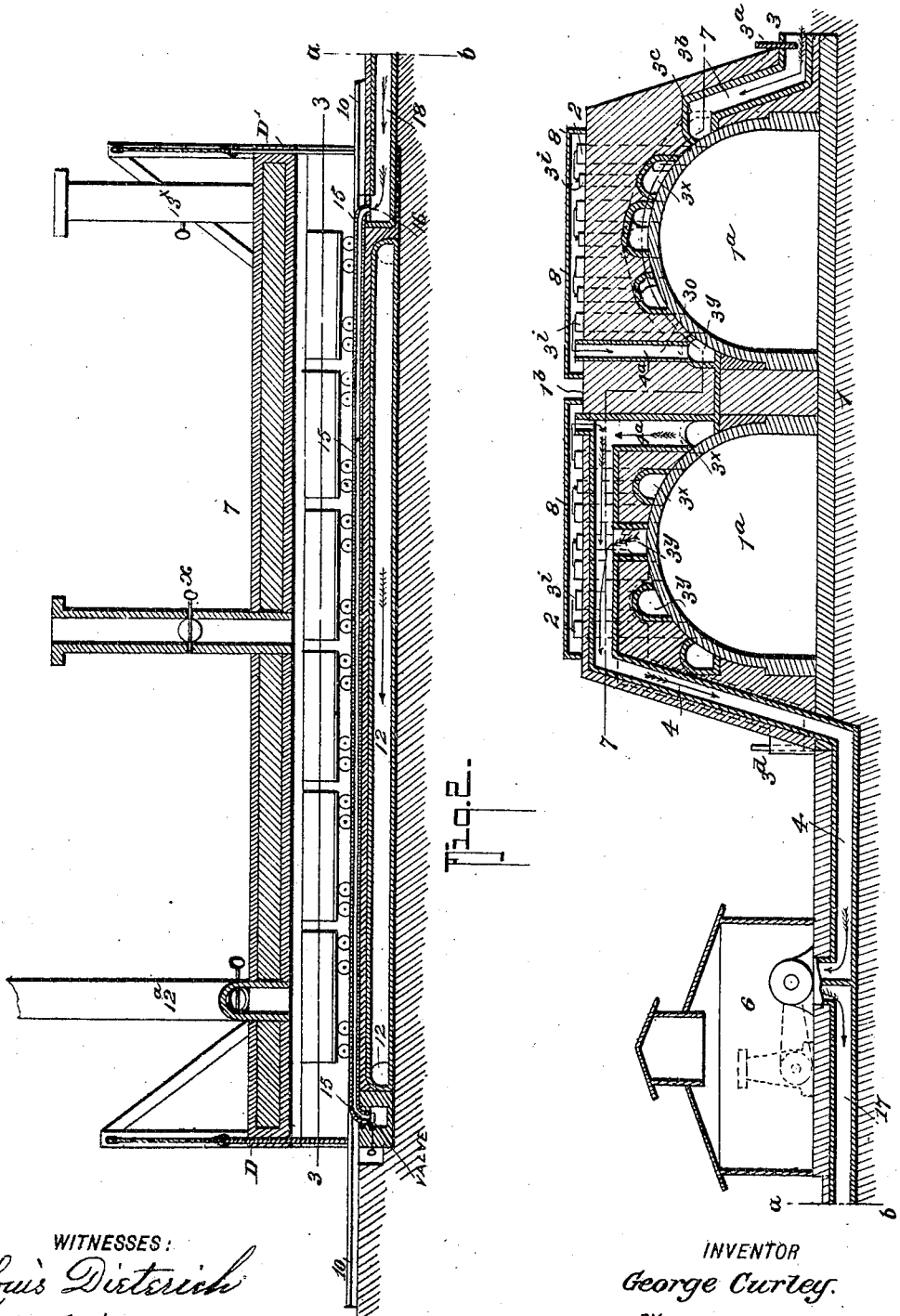

No. 837,547. PATENTED DEC. 4, 1906.
G. CURLEY.
COMBINED CONTINUOUS KILN AND DRIER.
APPLICATION FILED JUNE 22, 1906.
5 SHEETS—SHEET 3.
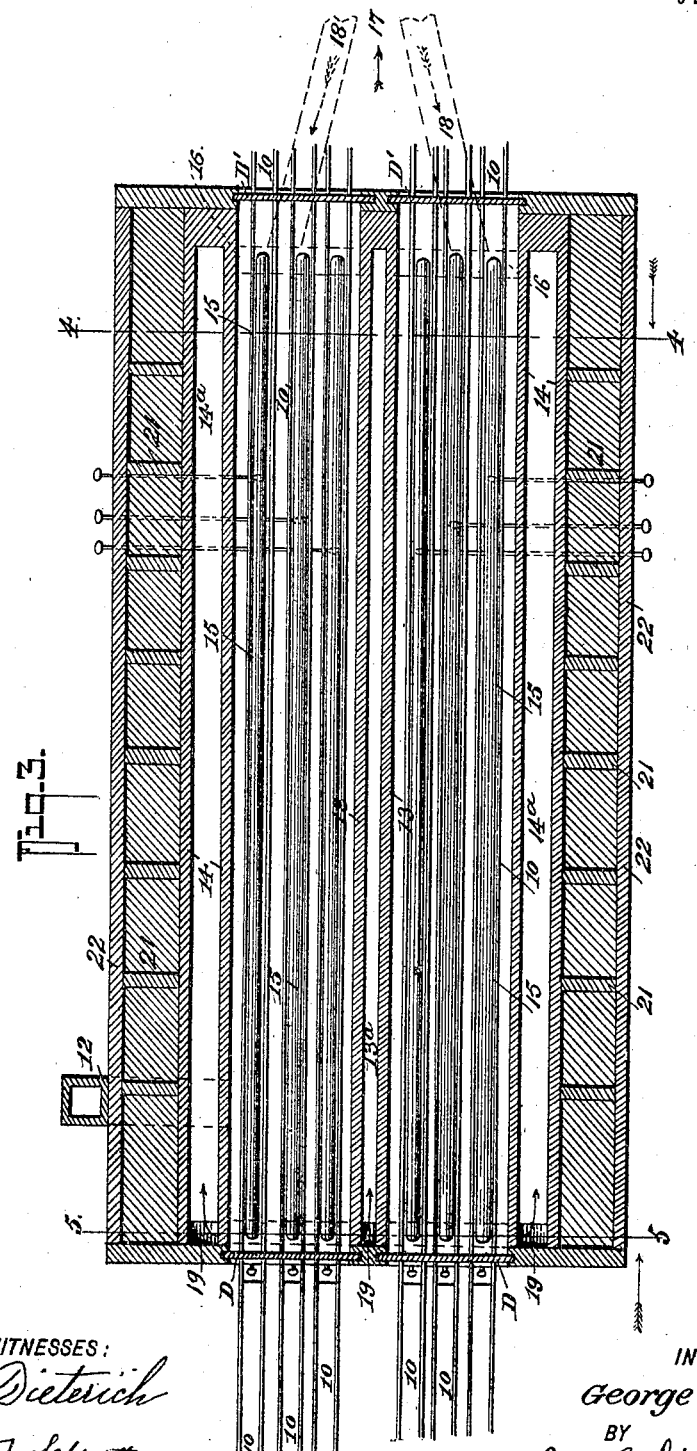
WITNESSES:
Louis Dieterich
John T. Schrott
INVENTOR
George Curley
BY
Fred G. Dieterich & Co.
ATTORNEYS No. 837,547. PATENTED DEC. 4, 1906.
G. CURLEY.
COMBINED CONTINUOUS KILN AND DRIER.
APPLICATION FILED JUNE 22, 1906.
5 SHEETS—SHEET 4.
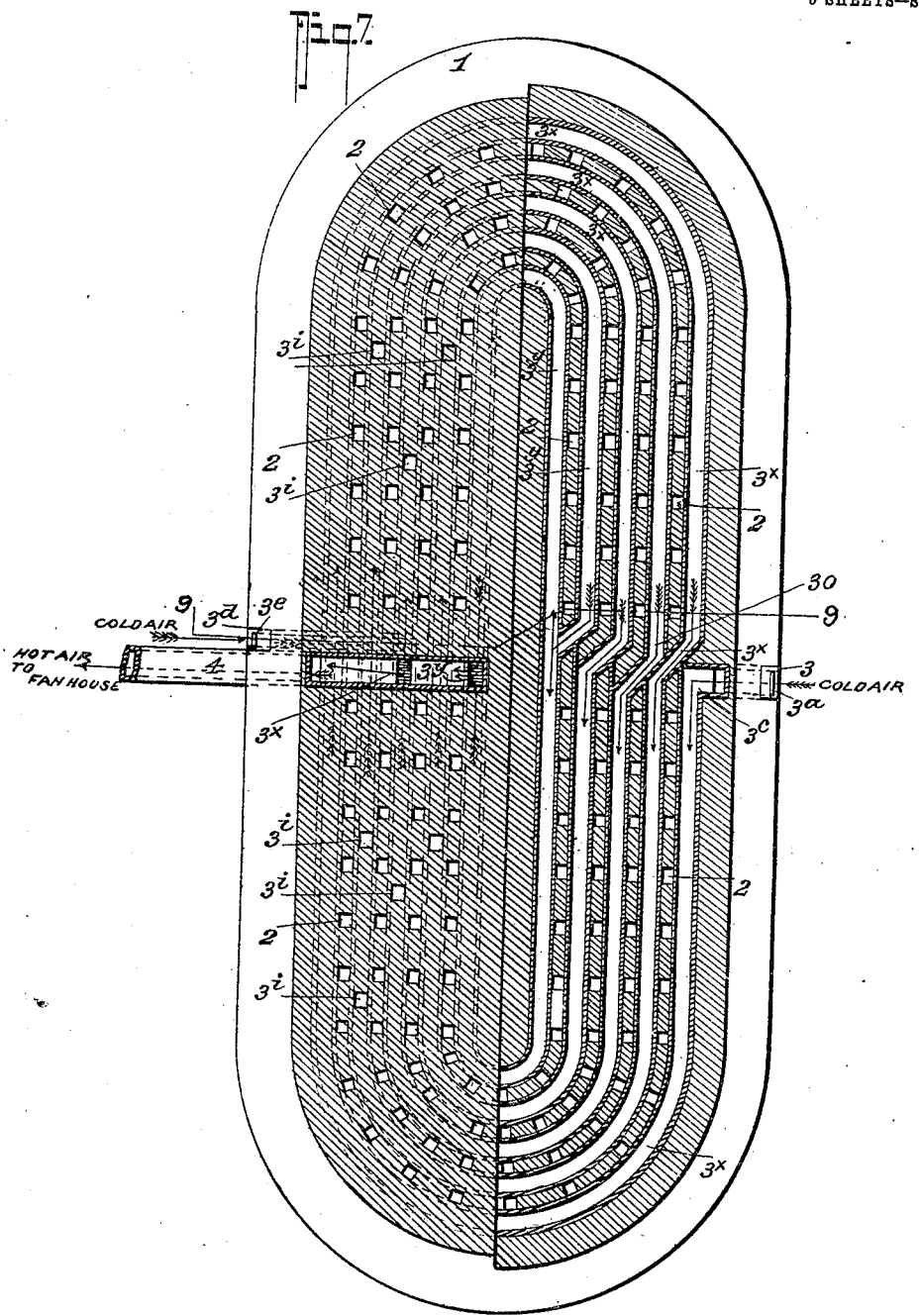
WITNESSES:
INVENTOR
George Curley
BY
Fred G. Dieterich & Co.
ATTORNEYS No. 837,547. PATENTED DEC. 4, 1906.
G. CURLEY.
COMBINED CONTINUOUS KILN AND DRIER.
APPLICATION FILED JUNE 22, 1906.
5 SHEETS—SHEET 5.
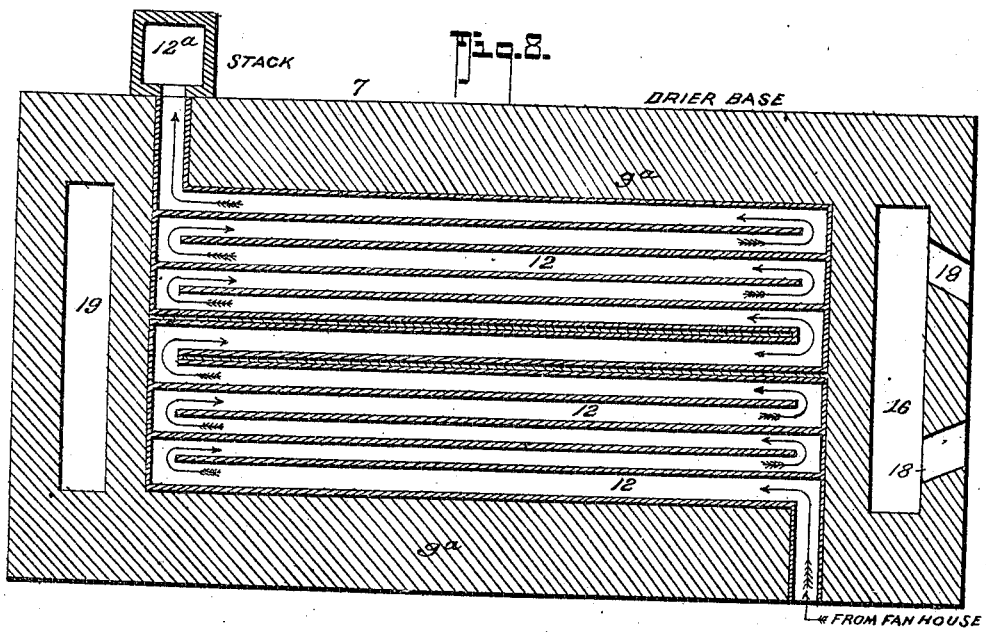
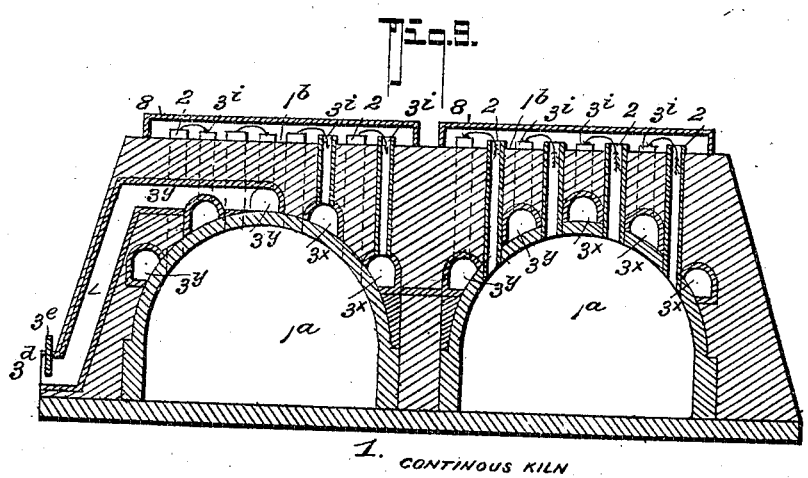
WITNESSES:
Louis Dieterich
John T. Schrott
INVENTOR
George Curley
BY
Fred G. Dieterich & Co.
ATTORNEYS

UNITED STATES PATENT OFFICE.

GEORGE CURLEY, OF SALT LAKE CITY, UTAH.

COMBINED CONTINUOUS KILN AND DRIER.

No. 837,547.  Specification of Letters Patent.  Patented Dec. 4, 1906.

Application filed June 22, 1906. Serial No. 322,859.

*To all whom it may concern:*

Be it known that I, GEORGE CURLEY, residing at Salt Lake City, in the county of Salt Lake and State of Utah, have invented certain new and useful Improvements in a Combined Continuous Kiln and Drier, of which the following is a specification.

This invention seeks to provide a new and improved construction and coöperative arrangement of kiln for burning ceramic ware, brick, pottery, &c., and a drier-house for drying the green ware, which is heated and maintained at the desired temperature by the waste heat that discharges from the kiln, whereby the operation of drying is effected practically without expense of special firing or fuel consumption.

Generically my invention comprehends a kiln having means for continuously circulating the air to be heated in such manner whereby without a material increase in the expense of fuel over what is generally used in the ordinary types of kilns it is constantly taken from the outside of the kiln and is heated to the maximum temperature, in practice to one thousand degrees, more or less, sufficient to quickly and uniformly dry green brick in the drying-house, and such arrangement and construction of flues whereby to retain the heat that passes off from the kiln and which is usually wasted and maintain same at a substantially high temperature as it is being circulated through the drying-house.

In its more complete nature my invention embodies an improved construction of kiln having the peculiar arrangement of continuous flue for conveying air in such manner around the kiln or burning chamber whereby to heat the same at the desired maximum temperature and combined with the discharge or steam flues from the interior of the flue, whereby the water, smoke, or steam that passes from the kiln-chamber is drawn off into the continuous air-flues, thoroughly disseminating same, so that nothing but hot air at a very high temperature is conveyed into the drier-flues, which form the drafts for the continuous kiln-flues and which convey the kiln-heated air through the drying-house in such manner whereby to effect a perfect and expeditious drying of the green ware held therein.

In its still more subordinate features my invention consists in certain details of construction and peculiar combination of parts, all of which will be hereinafter fully described, pointed out in the appended claims, and illustrated in the accompanying drawings, in which—

Figure 1 is a diagrammatic plan view illustrating the general arrangement of my combined continuous kiln and drying-house. Fig. 2 is a longitudinal section thereof, taken substantially on the line 2 2 on Fig. 1. Fig. 3 is a horizontal section of the drying-house, taken on the line 3 3 on Fig. 2. Fig. 4 is a transverse section of the drying-house, taken substantially on the line 4 4 on Fig. 3. Fig. 5 is a similar view taken on the line 5 5 on Fig. 3. Fig. 6 is a detail cross-section of a slightly-modified form of the drying-house bottom. Fig. 7 is a horizontal section of the continuous kiln, taken substantially on the line 7 7 on Fig. 2. Fig. 8 is a horizontal section of the drying-house, taken substantially on the line 8 8 on Fig. 4. Fig. 9 is a cross-section of the continuous flue, taken on the line 9 9 on Fig. 7.

In carrying out my invention I prefer to arrange the drier-house and the kiln substantially in the manner shown in Fig. 1, in which 1 designates the continuous-flue kiln; D, the drier-house; F, the fan-house, located between the kiln and drier-house, and $a$ $a$ and $b$ $b$ supplemental kilns, which may or may not be coupled with the kiln, as will hereinafter be more fully explained.

1 designates the kiln, the construction of which and its adaptability for combining with my improved construction of drier-house form the essential features of this invention. Said kiln as it is illustrated by Figs. 2, 7, and 9 includes two longitudinally-disposed kiln-chambers $1^a$ $1^a$, having an arched top, which chambers in practice are fired in any approved manner.

Built around the sides and over the top of the chambers $1^a$ $1^a$ is a system of air-conveying flues that extend continuously and with their ends arranged in semicircular form, as shown, and these flues connect at each side of the kiln with cold-air intakes 3, located midway the kiln and at the bottom thereof, as clearly shown in Fig. 2, and each of which has a gate $3^a$ for regulating the inflow of the air to the flues.

The two intakes 3 extend up the sides of the kiln and discharge into the flue-passages that extend continuously around and over the kiln-chambers $1^a$ $1^a$, the passages designated $3^x$ at one side of the kiln being joined by transversely-disposed sections $3^\circ$. (See Fig. 7, from which it will be seen that the air taken in at the opposite sides in entering the continuous flue-passages will be circulated and conveyed in the manner indicated by the several arrows on Fig. 2.)

8 designates the continuous shallow hot-air-collecting chamber, located on the top of the kiln and comprising the parallel side portions and the circular ends $8^a$, that connect the side portions, each side portion being arranged to extend over a series of vertical flues $3^i$, that communicate with the flue-passages, and another series of flues 2, that extend through the crown of the kiln-chamber and serve as a means for the exit of the water, smoke, and steam from the said kiln-chambers.

By providing the collecting-chamber 8 and the flues $3^i$ and 2, as shown, it is manifest that the water, smoke, and steam are drawn up through the flues 2, of which there are a large number, so that from the beginning to the end of the passage of the cold air over the radiating-surface of the kiln the smoke and steam will be drawn from the chambers 8 into the said air-flues 2 and be thoroughly disseminated in its passage through the flues $3^i$ and in such manner as to not interfere with the maximum heating of the cold air before it passes from the continuous kiln of the drier-house.

At the discharge side of the kiln and diametrically opposite the intake at the opposite side is formed a duct for drawing off the heated air, which consists of a large flue 4, that extends up the exit side of the kiln and transversely over the kiln-chamber at that side and formed with pendent portions $4^a$ $4^a$, that communicate with the horizontal flues $3^x$ $3^y$, as clearly shown in Fig. 2.

By reason of the construction of the kiln as described it will be readily understood that the cold air as it is drawn into the continuous flue-passages is circulated many times over the radiating-surface of the kiln-chambers $1^a$ $1^a$, and by reason of providing a large number of outlets in the kiln-tops that communicate with the said continuous flue-passages the water, smoke, and steam, as fast as they are created within the kiln-chambers $1^a$ will be drawn into the circulating current of air and thoroughly dried out as the cold air is heated to a maximum degree and drawn off to be utilized as a means for heating the drier-house, the construction of which and the particular arrangement of its flues being such that the waste heat from the kiln can be maintained for a long time at a high temperature, at least sufficiently high to provide for thoroughly drying the green ware held within the drier-house.

To provide for a strong feed of cold air and its thorough circulation and the induction of the water, smoke, and steam into the said flues, I connect a suction-fan 6 with the off-take 4, as shown in Fig. 2, and I also arrange that this fan will take the hot air and force it into the circulating-flues of the drier-house, the general method of utilizing said hot air being best understood by reference to Figs. 2 and 8, from which it will be seen that the hot air from the fan-house is discharged into the conveying-tube 17, that communicates with the lateral feed-sections 18 18, that discharge into the transversely-disposed flues 16 at the forward end of the drier-house and which communicate with the longitudinally-extended and vertically-projected side flues $14^a$ $14^a$ and the central flue $13^a$, with which connect the stacks $14^x$ $14^x$ and $13^x$, provided with valves $x$, the regulating of which deflects the hot air through the circulating pipes or chambers, presently referred to, when the stack $12^a$ is cut off.

The drier also has a series of longitudinal flues below its floor, which communicate with transverse end flues 16 and 19, connecting the opposite ends to supplemental heating-pipes 15, that extend up over the floor of the drier-house between the several sets of track-rails, as clearly shown in Fig. 5, upon which the cars containing the green ware are run, it being understood that the said rails 10 are located within the drier-chambers 9 and that the stack $12^a$ communicates with the said chambers 9 9 through the crown thereof, and the said stack has cut-off valves, as shown.

Instead of providing the heating-pipes 15 and arranging them on top of the drier-house floor the supplemental heat-conveying means may be in the nature of additional horizontal and longitudinally-extended flues 25 25, located over the flues 12 12 and under the drier-house floor, as shown in Fig. 6, and such flues 25 25 connected at the ends with the transverse spaces 16 and 19.

If desired, additional kilns may be connected with the fan-house and the waste heat therefrom fed into the drier, as indicated in dotted lines in Fig. 1.

From the foregoing description, taken in connection with the accompanying drawings, it is believed the complete construction, the operation, and the advantages of my invention will be readily understood.

It will be noticed that by reason of the peculiar construction of the continuous kiln and the manner in which the distributing-flue for the drier is arranged the air heated by the waste or radiated heat of the kiln is caused to circulate within the drying-house at a degree of temperature sufficient to provide for a thorough drying out of the green ware, thus making it possible to operate the drier with practically no expense, since no additional expense or extra fuel capacity is required for maintaining the continuous kiln.

D D′ designate vertically-adjustable gates that work over the opposite ends of the drying-house chambers, as shown in Fig. 2, and by means of which the said chambers can be closed in after the ware has been conveyed therein or readily raised to permit of the withdrawal of the ceramic or other ware holding platform.

In the practical application of my invention any kind of draft may be used, either forced, fan, or stack, and the method of taking cold air from outside can be readily applied to other forms of continuous or arched kilns and conveyed to other forms of driers.

The intake and outlets may be at any point of the kiln to suit the particular form of plants already built for which my invention may be adapted.

Having thus described my invention, what I claim, and desire to secure by Letters Patent, is—

1. A combined drier and kiln comprising a series of continuously-extended air-flues, located over the heat-radiating surfaces of the kiln-chamber and hot-air-distributing flues for the drier-house, in communication with the continuous kiln-flues.

2. In a combined drier and kiln of the character described; a drier having heat-distributing flues, valved offtakes therefor, said drier having a valved stack in communication with its drying-chambers; a kiln having a series of continuous air-passages over its heat-radiating surfaces, and water-smoke outlets that discharge into the said passages and a means for conveying the hot air from the said air-passages to the drier-house flues, as set forth.

3. The combination with the drier-house, having a series of longitudinal flues, transverse flues in communication therewith, a plurality of valved offtakes for said flues, and having a valved offtake-stack in communication with the drying-chambers; of a kiln and means combined therewith for concentrating and conveying the radiated or waste heat therefrom and discharging the same into the flues of the drier-house.

4. In combination with a drier-house having heat-distributing flues, valved offtakes connected therewith and a valved stack in communication with the drying-chambers; of a kiln, and a means for continuously passing air over its heat-radiating surface, collecting the heated air and circulating it in the drier-house flues, as set forth.

5. In combination with the drier-house, said house having heat-distributing flues; of a kiln having a series of continuously-running air-passages located over its radiating-surfaces, a series of flues from the kiln-top that communicate with the said air-passages and a means for drawing off the hot air in the said continuous flues and discharge the same into the drier-house distributing-flues, as set forth.

6. In a combined drier and kiln of the character described, in combination with the kiln, of a series of air-flues located in the radial heat zone of the kiln, said flues extending continuously from their intake to their discharge points, a supplemental chamber having communication with the kiln-chambers and adapted to receive the water-smoke and steam therefrom and a series of flues that connect the supplemental chamber with the continuous air-flues and means for creating a forced draft in said flues, as set forth.

7. In a combined drier and kiln of the character stated, a series of longitudinal flues under the drying-chamber floors, transverse flue connections that join the longitudinal flues at their ends, an intake to the said flues, means for collecting the waste radiated heat of the kiln and forcing it into the drier-flues, valved offtakes connected with the said flues and a valve-controlled stack that communicates with the waste-receiving chambers of the drier.

8. A continuous kiln, comprising the longitudinally-disposed combustion-chamber, having flues that project upwardly above the kiln-top, a casing mounted on the kiln-top and extended continuously thereover and over the discharge ends of the vertical flues from the kiln-chamber whereby to receive the water-smoke and steam from the kiln-chambers, a series of continuously-extended air-flues mounted over and around the sides and top of the kiln-chambers but not in direct communication therewith, a series of vertical air-flues that connect with the other air-flue and discharge into the casing on top of the kilns, means for feeding in the cold air to the continuous flues and for drawing off the hot air therefrom, substantially as shown and for the purposes described.

9. In a combined drier and kiln of the character described, the combination with the longitudinally-extended chambers 1ª 1ª; of a series of parallelly-disposed air-flues extended lengthwise the kiln over one of its chambers 1ª, another similar series of flues arranged over the other kiln-chamber, the two sets of flues being connected at the ends and joined to form a continuous air-passage, cold-air intakes that connect with the two series of flues, at diametrically opposite sides, an offtake that connects with all the flues at the other side, a series of vertical flues projected from the continuous air-flues through the top of the kiln, a collecting-chamber into which the said flues discharge and another set of flues that extend through the crown of the kiln-chambers and discharge into the said collecting-chamber and a means for drawing off the hot air from the continuous flue, for the purposes described.

10. In a combined drier and kiln of the character described, the combination with the kiln-chambers 1ª 1ª and the drier having hot-air flues for heating its drying-compartment; of means for collecting the waste heat that radiates from the kiln-chambers 1ª 1ª, comprising a series of parallelly-disposed flues in communication with each other, another set of flues that discharge the steam and water-smoke from the kiln that empty into the air-flues, cold-air intakes that connect with the two series of air-flues, an offtake that connects with the said air-flues and a duct that connects the said offtake with the air-flues for the drier and a blast-fan in connection with the duct, for the purposes described.

GEORGE CURLEY.

Witnesses:
W. F. EARLE,
C. J. BRAIN.